H. F. SCHRODER.
JOURNAL BEARING.
APPLICATION FILED DEC. 17, 1910.
1,116,634.
Patented Nov. 10, 1914.
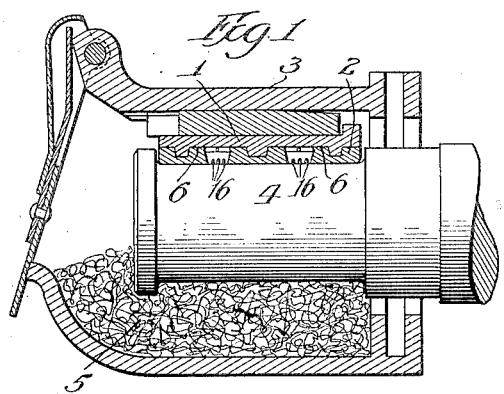
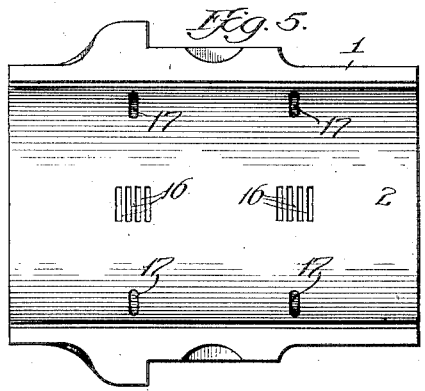
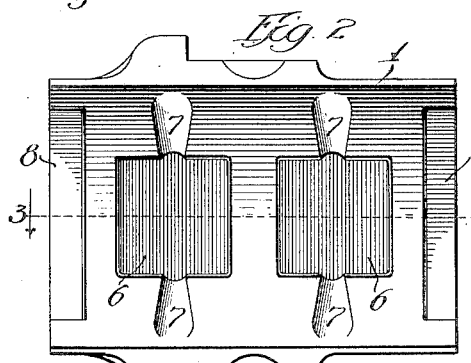
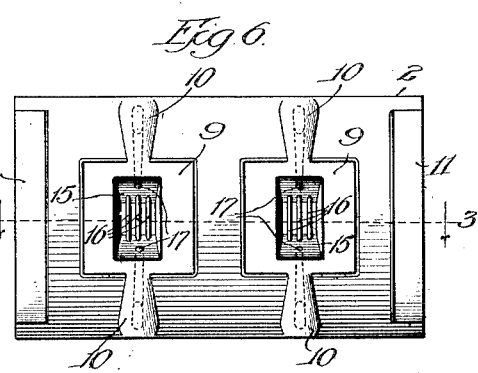
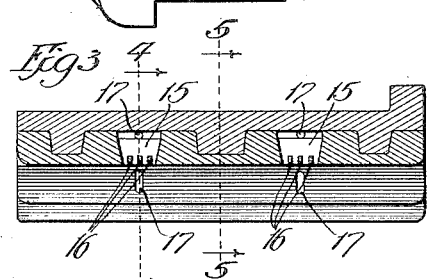
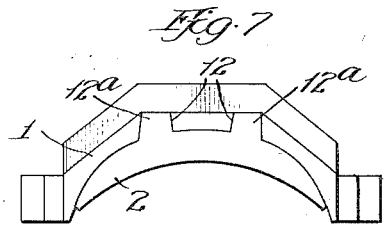
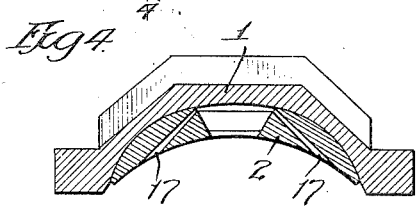
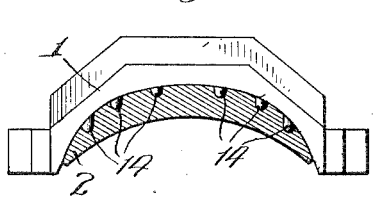
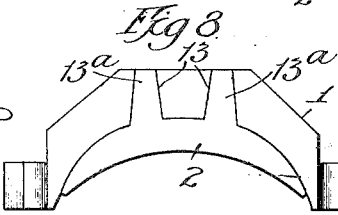
Witnesses
Geo. C. Dawson
A. H. Rabang
Inventor:
Herman F. Schroder
By Barton & Folk,
Attys.

UNITED STATES PATENT OFFICE.

HERMAN F. SCHRODER, OF BERWYN, ILLINOIS, ASSIGNOR TO PARAGON METAL COMPANY, OF CHICAGO, ILLINOIS, A CORPORATION OF ILLINOIS.

JOURNAL-BEARING.

1,116,634.        Specification of Letters Patent.      Patented Nov. 10, 1914.

Application filed December 17, 1910. Serial No. 597,822.

*To all whom it may concern:*

Be it known that I, HERMAN F. SCHRODER, a citizen of the United States, residing at Berwyn, in the county of Cook and State of Illinois, have invented a certain new and useful Improvement in Journal-Bearings, of which the following is a full, clear, concise, and exact description.

My invention relates to journal bearings in general and more particularly, as to certain of its features, to a journal bearing for the axle of a railway-car or the like.

One object of my invention is to provide a structure in which the lubricant is automatically fed to the point where there is the greatest pressure between the journal bearing and the journal.

Another object of my invention is to provide an improved journal bearing for railway-cars and the like having the maximum resistance to strains and stresses and to wear due to friction.

It is well-recognized that a journal bearing for railway-cars and the like must resist pressure and strains, especially torsional strains, at six distinct points, namely, at each of the four corners of the bearing and upon the opposite sides of the center thereof.

It is one object of my invention to provide a composite journal bearing in which there are no longitudinal side cavities in the brass which would weaken the sides of the brass.

With a view to strengthen the four corners of the main shell, said corners are preferably made as continuations of the concave inner face of the main shell. It follows, therefore, that, by reason of the fact that at its longitudinal center and near each end the brass is not thinned by any concavity in its surface, the bearing is especially strong at the points which are most subjected to strain.

It is thus an object of my invention to provide an improved composite journal bearing comprising a main shell of any suitable hard metal and a lining shell of any suitable antifriction metal, each cast separately and yet capable of being removably put together and, when so put together, being so thoroughly and closely interlocked as to constitute in effect an integral bearing.

While it is my object to so construct the meeting faces of the brass and its lining shell as to provide a thorough interlocking of the parts, this is done without weakening the bearing at the points where greatest strength is desired.

In order to clearly set forth the several features of my invention, I have shown the same as embodied in a journal bearing for railway-cars.

Referring to the drawings, Figure 1 is a vertical sectional view through the journal box, showing the bearing in place therein and the journal mounted in said bearing; Fig. 2 is a plan view of the inner face of the main shell or brass of the bearing; Fig. 3 is a sectional view on the line 3—3 of the two parts shown in Figs. 2 and 6, when assembled; Fig. 4 is a section on the line 4—4 of Fig. 3; Fig. 5 is a plan view of the inner face of the composite bearing; Fig. 6 is a plan view of the convex face of the lining shell which fits the inner face of the main shell. Figs. 7 and 8 are end elevations of the opposite ends of the composite bearings; and Fig. 9 is a view of a modified form of my invention showing the main shell in end elevation and the lining shell in cross-section.

Like letters of reference refer to like parts throughout the several views.

The composite journal bearing shown in the drawings comprises a main shell or brass 1 of hard metal, and a lining shell 2 of suitable anti-friction metal, the composition of said main and lining shells being preferably that usually employed in such shells. The exterior face of the brass 1 is preferably of the construction adopted by the Master Car-Builders' Association and is mounted on the journal box 3 in the usual well-known manner. The weight of the car is supported, through the journal bearing, upon the journal 4 in the usual manner. The packing 5 inside the journal box is saturated with a lubricant which is thereby applied to the journal 4.

Heretofore it has been customary to provide the interior face of the brass with a series of ribs and with longitudinally extending side cavities. Such arrangement of ribs and cavities tends to weaken the brass and cause a fracture in the sides and ends thereof. In my invention I preferably provide the inner face of the brass with two rectangular central cavities 6, 6, one for each end of the brass. Extending from the opposite sides of each of said cavities 6 are lateral cavities 7 which extends transversely of the brass and which gradually decrease in depth as they extend outward from the central cavity. The brass may be further cut away at each end, as indicated at 8, 8. By such construction I provide a brass having a cylindrical bore provided with suitable cavities at points which do not materially weaken the brass and which is free from any longitudinally extending ribs or cavities.

The convex surface of the lining shell has a shape which will adapt it to snugly fit the concave surface of the main shell. Thus the convex side of the lining shell is provided with two central rectangular lugs 9, 9 adapted to fit in the cavities 6, 6, and with lateral ribs 10, 10 extending from the lugs 9 transversely of the lining shell. At each of its ends the lining shell is provided with end ribs 11, 11 adapted to fit in the cutaway portions 8, 8 at the ends of the main shell. If desired, the ends of the main shell may also be notched as indicated at 12, 13 in Figs. 7 and 8, in which case the ribs 11 are provided with lugs 12$^a$ and 13$^a$ which fit in said notches. By such construction the lining shell is firmly held in the main shell and cannot be displaced by torsional strain. Instead of a construction which provides the notches 12 and the lugs 12$^a$ fitting therein, or as additional to such structure, the inner face of the main shell may be provided at its ends with a series of teats 14, the lining shell being provided with cavities for receiving said teats. Such teats also serve to take up the end thrust exerted on the lining shell by the car axle. Each of the lugs 9 is provided with a pocket 15 which opens on the bearing face of the lining at the crown thereof. The mouth of said pockets is preferably provided with a grating 16. Longitudinally of each of the ribs 10 and extending through the lining shell is a lubricating hole 17, which thus extends from one side of the bearing to said pocket. The hole 17 thus extends from the side of the bearing at which place the lubricant tends to accumulate to the crown of the bearing, where, by reason of the great pressure exerted between the bearing and its journal there is a tendency of the lubricant to fail to penetrate. The holes are preferably tangential of the journal 4 and of the inner curvature of the lining 2 and extend from the point in the side of the lining at which pressure begins to be exerted between the bearing and the journal through the lining to the pockets 15.

As is well-known, by reason of the pressure between the journal and its bearing, the lubricant accumulates in longitudinal beads at the sides of the bearing and fails to penetrate to the crown thereof. The rotary motion of the journal 4 exerts a centrifugal action upon the lubricant, and, by providing the lubricating holes as above described, the lubricant is pumped or forced, as it were, up through the holes 17 into the pockets 15, which pockets are thus kept filled with the lubricant under pressure. It is also apparent that as the lubricant is thus forced from the pockets 15 onto the upper surface of the journal 4, such feed of the oil will also produce a suction in the pockets 15 which will assist the feeding of oil thereto through the lubricating holes 17. In order that the greatest advantage may be derived from such suction it is, of course, desirable that the holes 17 and the pockets 15 be air-tight. It is with such end in view that the hole 17 extends preferably through the lining. It is obvious that by reason of the great extent of the meeting faces of the shell and its lining and the close fit thereof, the pockets 15 are made air-tight. Furthermore the oil which will work its way in between the shell and the lining will assist in excluding the air from the pocket.

From the foregoing it will be understood that my invention, as applied to the lubritation of journal bearings for railway-cars, depends upon the rotary motion of the journal forcing the lubricant through holes from the point where the lubricant tends to accumulate to a point where great pressure is exerted between the journal and its bearing. It will be understood that a sufficient number of these lubricating holes 17 may be provided to keep the pockets 15 well filled with oil, and that such a number of the pockets may be provided as may be deemed necessary to properly distribute the lubricant. It will further be understood that while the particular structure of the meeting surfaces of the shell lining are such as to peculiarly adapt themselves to the lubricating features of my invention, that such structure is also of importance and value irrespective of the lubricating means employed in conjunction therewith, such structure providing a journal bearing peculiarly adapted to withstand the severe usage to which it is subjected.

Having thus described my invention, what I claim is:—

1. In a composite journal bearing, the combination with a main shell of hard metal having in its inner face a central cavity, and a lateral transversely extending cavity communicating with said central cavity; of an auxiliary, removable lining shell of suitable anti-friction metal having a lug fitting in the central cavity of said main shell and a transverse rib fitting in the transversely extending cavity, said lug being provided with a pocket opening on the bearing face of said lining shell, and said lining shell being provided with a hole therein longitudinally of said rib, said hole extending from the bearing face of said lining shell to said pocket.

2. In a composite journal bearing, the combination with a main shell of hard metal having central cavities in its inner face, of an auxiliary, removable lining shell of suitable antifriction metal having lugs fitting in said cavities, said lugs being each provided with a pocket opening on the bearing surface of said lining shell, and said lining shell being further provided with lubricating holes extending therethrough, said lubricating holes being constructed and arranged to feed lubricant from the sides of said lining shell to said pockets.

3. In a composite journal bearing, the combination with a main shell of hard metal having in each end of its inner face a central cavity and two lateral, transversely extending cavities communicating with the opposite sides of the central cavity, of an auxiliary, removable lining shell of suitable antifriction metal having lugs and ribs fitting in the corresponding central cavities and lateral cavities, respectively, of said main shell, said lugs being each provided with a pocket opening on the bearing surface of said lining shell, and said ribs being each provided with a lubricating hole extending from one side of the lining shell longitudinally of said ribs and communicating with the corresponding pocket.

4. In a composite journal bearing, the combination with a main shell of hard metal having in each end of its inner face a central, rectangular cavity and two lateral transversely extending cavities communicating with the opposite sides of the central cavity; of an auxiliary, removable lining shell of suitable antifriction metal having rectangular lugs fitting in the corresponding central cavities in said main shell and transverse ribs fitting in the corresponding transversely extending cavities, said lugs being each provided with a pocket opening on the bearing face of said lining shell, said lining shell being provided with gratings over said pockets, and said lining shell being further provided with holes therein longitudinally of said ribs, said holes extending from the bearing faces of said lining shell to said pockets.

5. In a composite journal bearing, the combination with a main shell of hard metal having in its inner face a central cavity and two lateral transversely extending cavities communicating with the opposite side of the central cavity; of an auxiliary, removable lining shell of suitable antifriction metal having lugs fitting in the central cavities in said main shell and transverse ribs fitting in the corresponding transversely extending cavities, said lug being provided with a pocket opening on the bearing face of said lining shell, said lining shell being further provided with holes therein longitudinally of said ribs, said holes extending from the bearing faces of said lining shell to said pocket.

In witness whereof, I hereunto subscribe my name this fifteenth day of December, A. D., 1910.

HERMAN F. SCHRODER.

Witnesses:
GEORGE E. FOLK,
ALFRED H. MOORE.